March 5, 1968     F. D. SCHRYVER     3,371,791
SCRAPER FOR ROTARY, MULTIPLE DISC FILTERS
Filed July 13, 1964     3 Sheets-Sheet 1
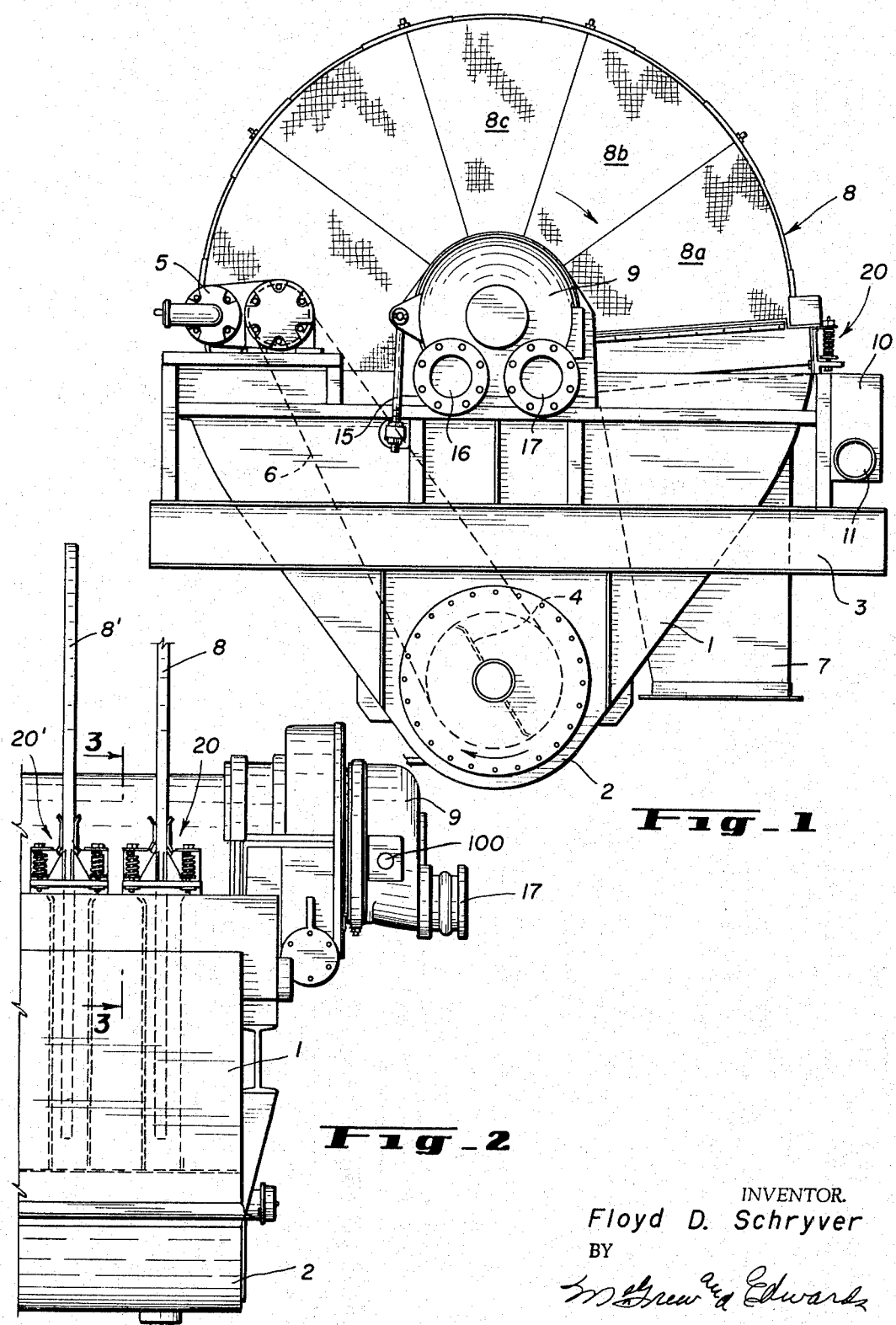
Fig_1
Fig_2
INVENTOR.
Floyd D. Schryver
BY
ATTORNEYS March 5, 1968 F. D. SCHRYVER 3,371,791
SCRAPER FOR ROTARY, MULTIPLE DISC FILTERS
Filed July 13, 1964 3 Sheets-Sheet 2
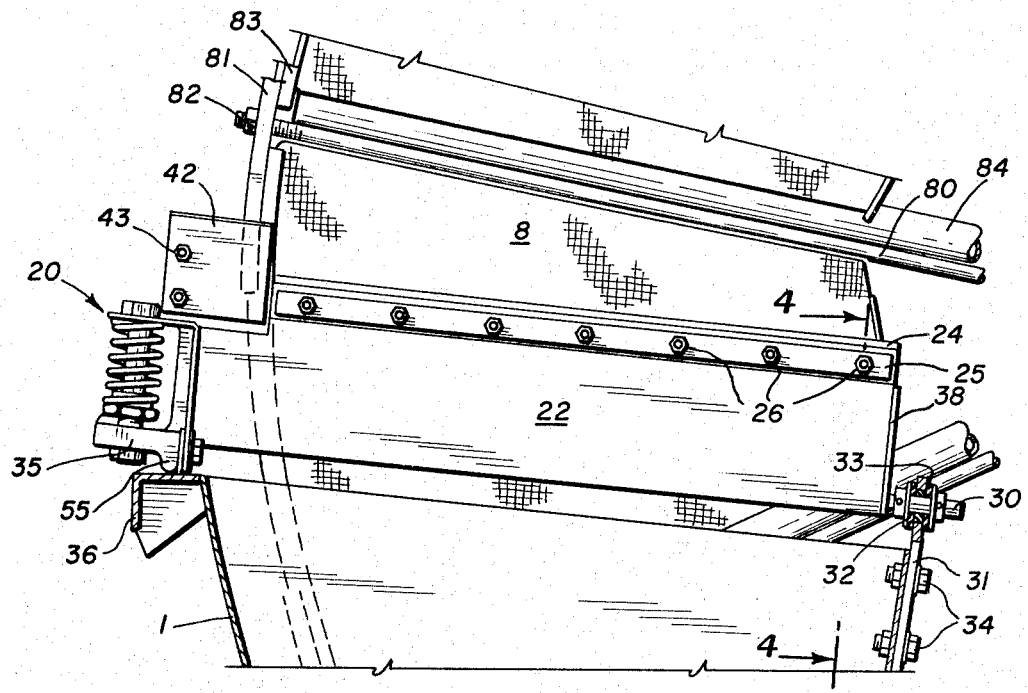
Fig_3
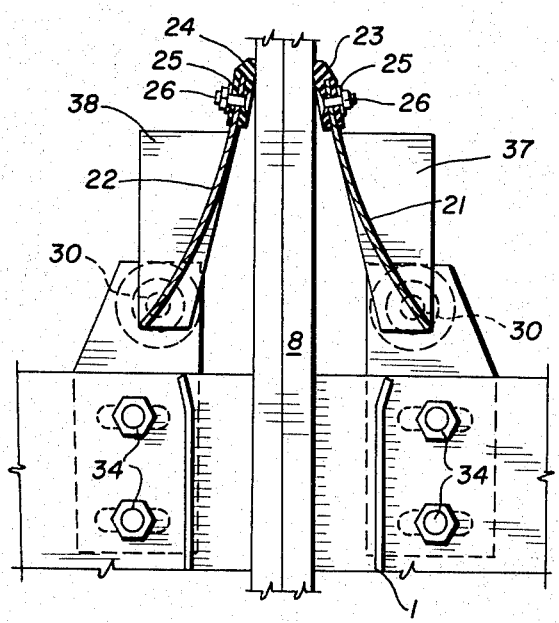
Fig_4
INVENTOR.
Floyd D. Schryver
BY
McGrew and Edwards
ATTORNEYS

United States Patent Office 3,371,791
Patented Mar. 5, 1968

3,371,791
SCRAPER FOR ROTARY, MULTIPLE DISC FILTERS
Floyd D. Schryver, Arvada, Colo., assignor to Denver Equipment Company, Denver, Colo., a corporation of Colorado
Filed July 13, 1964, Ser. No. 382,194
10 Claims. (Cl. 210—327)

This invention relates to improvements in leaf or disc filters and more particularly to improvements in filter cake scraper assemblies mounted in position to remove cake from moving filter leaves.

Disc filters are utilized in many industries and many different types of such filters are available commercially. The typical disc filter includes a plurality of segmented discs spaced along a hollow rotary shaft with a conduit in the shaft contacting the corresponding segment in each disc axially along the shaft. Each segmented sector or segment of each disc is covered with a filter medium so that liquid from a slurry may be drawn through the filter medium leaving a filter cake on the exterior. The discs are arranged to be partially submerged in a body of a slurry to be filtered, and by valving through the central shaft a vacuum may be applied to the segments in the slurry for filtering operation. The cake, after leaving the slurry, may be washed, dried, etc. as desired. The filter cake is normally removed from the discs by applying air pressure to the inside of the filter medium, at one point of revolution, and a scraper assembly mounted on the filter aids in the removal of the cake. Filter discs can be of rather large diameter, and their construction does not permit absolute alinement of the discs, which are directed radially from the shaft. Common practice has been to interconnect the outer ends of the scraper on each side of the disc so that they tend to follow the oscillations of the disc.

In one modification of the present invention, the scraper blades are interconnected and so constructed that one blade may move independently of the other away from the filter disc in the event there is an obstruction on the disc in position to move against the blade. A crossover interconnection, which is spring loaded, permits the blades to be retained against the disc under spring tension and yet permits individual movement of the blades where necessary to thereby prevent damage to the disc and to the filter medium.

It is, therefore, an object of the invention to provide a scraper for a disc filter which is arranged to be positioned adjacent the side of a filter disc and interconnected with the scraper on the opposite side of the disc so as to provide a spring biased scraper on each side of the disc.

Another object of the invention is to provide a scraper arrangement for a disc filter which provides interconnected scrapers with each scraper independently spring biased against the surface of the disc to permit independent movement of the scraper blades down and away from the disc to clear obstructions.

A further object of the invention is to provide a simplified mount for the scrapers of a disc filter which provides conjoint movement of the scrapers for non-circular planar movement of the disc but with independent movement of the individual scrapers.

These and other objects and advantages of the invention may be readily ascertained by referring to the following description and appended illustrations in which:

FIG. 1 is an end elevational view of a disc filter showing the relation of the discs and scraper members;

FIG. 2 is a back side elevational view of the scraper arrangement showing positioning of the scrapers in relation to the filter tank;

FIG. 3 is an enlarged detail view of the mounting of a scraper arrangement for a disc filter;

FIG. 4 is a cross sectional view of the back support for the scraper of FIG. 3 taken along section line 4—4;

Figure 5:
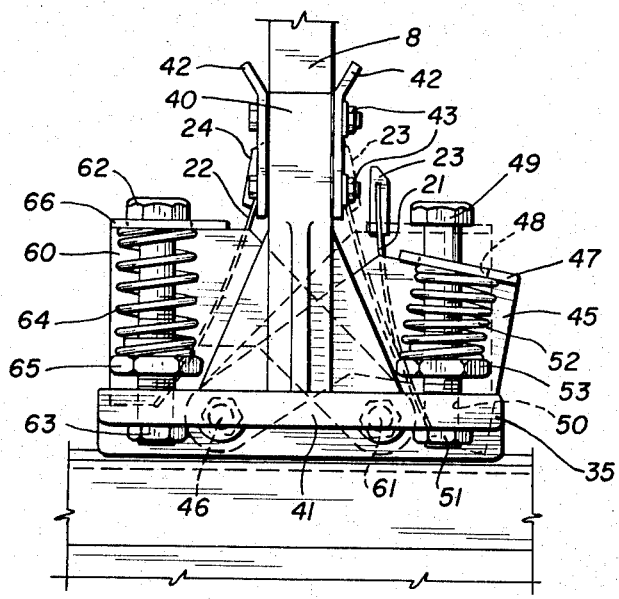
FIG. 5 is an enlarged detail of the front scraper mounting according to the invention.
Figure 6:
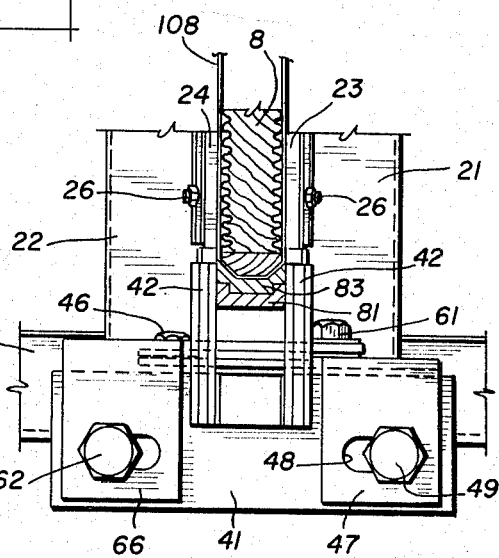
FIG. 6 is a partial top plan view of the front scraper mounting shown in FIG. 5.

In the device selected for illustration, a tank 1 is provided with a sump 2 and is mounted on a framework 3 which is arranged to be supported by a foundation. The sump is provided with a slurry agitator 4 driven by a variable speed drive 5 mounted on an upper portion of the tank and interconnected by means of a drive chain or belt 6 to the agitator. A series of discs 8 are mounted on a shaft which terminates in a valve housing 9 at one end, and the discs partially extend into the tank. The tank is provided with a feed launder 10 which has an overflow outlet 11 at one side thereof. The discs are composed of a plurality of segments, for example sectors 8a, 8b, 8c, etc. which combined form a disc. The sectors are individually secured to the shaft, as set out below. A plurality of said discs may be provided spaced along the shaft for the filter and the discs, depending on their size, may vary in the number of sectors required to form the disc. The valve 9 may be a standard rotary plate valve which is commercially available, and it is provided with an adjusting screw mechanism 15 at one side for adjusting the positions of orifices to the plate valve. A pair of filtrate outlets 16 and 17 provide means for withdrawal of filtrate.

The opening 100 (FIG. 2) is adapted for connection to the line providing the blow for cake discharge. A number of different types of rotary plate valves are available and in each instance they all include the same major elements of which an orifice plate remains stationary, and the sliding orifices which are connected to the conduits connected to the sectors. The valve may include outlets for the filtrate, cloudy filtrate, wash fluid, air, etc. Each of the series of conduits from the sectors progressively pass each of the orifices in the plate to apply suction to the sector or air pressure as the case may be. Since the valve is not part of the invention per se, such a general description is believed all that is necessary for the purposes of the present disclosure.

A scraper assembly, shown in general by numeral 20, is arranged so that a scraper blade is mounted on one side of each disc and a similar blade is positioned on the opposite side of the filter for scraping each side. As shown in FIG. 2, the disc 8 has its scraper assembly 20, disc 8' has its scraper assembly 20', and in a similar manner the individual discs mounted along the shaft have their individual scraper asemblies arranged to remove the cake from the filter. As shown in FIG. 4, a blade 21 is mounted on the right side of the disc 8 and a blade 22 is mounted on the left side.

The details of the blade assembly, as shown in FIGS. 3 through 5, as pointed out above, include right-hand and left-hand blades 21 and 22, respectively. The blade 21 is provided with a rubber scraper element 23 and the blade 22 has a scraper element 24, each scraper secured by means of a hold-down bar 25 held in place by bolt and nut assemblies 26. Each blade is mounted on a pivot which is secured to an inner mount and to an outer mount. Each blade is secured at an inner end by any suitable means to a support shaft 30 which is mounted at its inner end on an inner mount 31. The inner mounting 32 includes a rubber bearing 33 which is soft and resilient and permits wobbling of the shaft that occurs due to non-planar rotation of the disc. The outer end of each blade is supported from an outer scraper support generally designated 35 and the support is arranged to rest for reciprocal movement on a support ledge 36 mounted on the tank. The discharge side of the tank is crenellated to accommodate the discs and the blade shafts are spaced from the lip of the crenellations so that the blade will guide removed cake from the disc to a cake launder chute 7 to a cake recovery. Blade 21 is provided with a cake deflector 37 secured to its inner end, and blade 22 is similarly fitted with deflector 38.

The outer blade support 35 includes a T-shaped member in front elevation, shown in FIG. 5, which has a middle bar 40 secured to the T-head 41 arranged in an inverted position. Mounted on the upper part of the member 40 are a pair of opposed guide shoes 42 secured together by bolt and nut assemblies 43 and arranged to be positioned on either side of the edge of the disc 8 so as to guide the movement of the blades with the wobbling movement of the disc. The two guide shoes encompass the outer edge of a disc therebetween and laterally move the blades on any lateral or wobbling movement of the disc 8.

The front edge of the blade 21 is secured by welding or otherwise to lever arm 45 which is pivoted on a pivot 46 mounted in the T-head 41 adjacent the opposite blade 22 and beyond the center line of the disc. The lever arm includes a lateral top plate 47 which has an elongated bore 48 therein and through which passes a tension bolt 49. The tension bolt is threaded into a threaded hole 50 in the head 41 of the outer scraper support and it is secured in position by a lock nut 51 to permit adjustment of the normal position of the blade relative to filter cloth or media 108. A compression spring 52 is held adjustably in position against the lateral plate 47 by means of a retaining nut 53. The scraper blade 22 is, likewise, secured to a lever arm 60 and it is secured to a pivot 61 adjacent the bolt 49. A bolt 62 secured to the T-head by means of the lock nut 63, in a similar manner to that of bolt 49, supports a spring 64, secured in position by an adjusting nut 65, adjustably against a lateral plate 66 to provide tension on the scraper.

In each case the blades are pivoted from a point on the opposite side of the disc. Each blade is individually spring loaded against the disc and each blade has the ability to pivot down and away from the disc independently of the other, yet both are so arranged that they move conjointly with any movement in the disc. The inner supports permit both wobbling action of the blade shafts and pivoting movement. The independent pivotal movement of the blade permits the blade to pivot down and away from the disc in the event an obstruction on the disc encounters the blade. As shown in FIG. 5, the left-hand blade 22 is biased in normal position against the disc while the right-hand blade 21 is pivoted down and away from the disc with its compression spring depressed in a position to clear such an obstruction. The adusting nuts under each spring provide means for adusting the tension of the individual blades relative to the disc.

Since the discs are composed of a plurality of sectors spaced radially around the disc, means must be provided for holding the sectors on the shaft. As shown in FIG. 3, the sector is secured in position by means of a disc stay rod 80 on the outer end of which is mounted a sector clamp 81 held in position by a nut 82 on the rod. A sector guard 83 extends from about the rod to the next rod, and the blade guide shoes generally ride on the sector guard and the clamp. This prevents the shoes from riding on the filter medium 108. A sector pipe 84 extends along the sector stay rod and provides means for drawing a vacuum on the inside of the sector for the filtering action or for inserting fluid under pressure into the sector for cake removal, etc.

Figure 7:
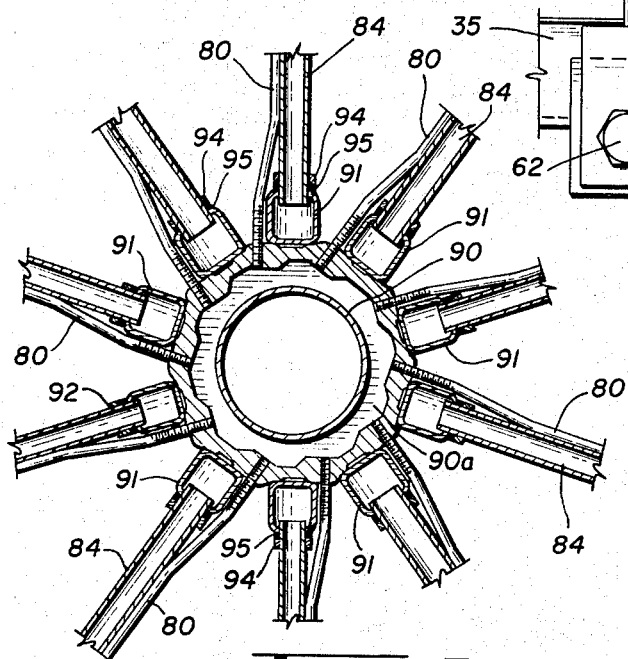
FIG. 7 is a cross sectional view of the central shaft of the disc filter with the mounting arrangement of the individual sectors thereon according to the invention.

The sectors are mounted on a central shaft 90, shown in FIG. 7, which includes a hub 90a having a plurality of flattened areas spaced therearound. On each flattened area a rectangular tube 91 is positioned. A series of holes 92 are bored on each of the tubes in position to accommodate the sector pipe 84 which communicates with each sector. The sector pipes 84 have an encompassing washer 94 which is secured to the pipe, and a gasket 95 between the tube and washer provides a seal. The sectors are secured in position on the shaft stay rods 80 which are threadedly secured to the shaft 90 and extend radially outwardly. The sectors are pulled down tight into position by means of the clamp 81 and the nut 82. It is obvious since a series of discs are placed along the shaft at each disc position a hole is bored in each tube circumferentially, as well as a series of circumferential tapped holes to accommodate a series of rods therearound, there being ten such rods shown in FIG. 7 to accommodate ten sectors around the disc.

The scrapers operate to remove the cake from the filter medium and to permit it to fall in the cake discharge chutes on the crenellated edge of the tank. The disc moves toward the scrapers, shown in FIG. 1, and in most cases just prior to where the disc contacts the scraper air is applied to the sector to aid in the removal of the cake. The normal operation of the filter requires that the tank be kept at least partially full of slurry and generally sufficiently full to cover the sectors as they are in the slurries which provides for efficient filtration. By means of the disc valve, the suction is continued past the point where the individual sector emerges from the slurry so as to aid in drying the cake. Where wash water is used, by means of a spray on the cake, the disc valve may provide a wash water discharge which is attached to a vacuum pump for drawing the wash water through the cake prior to passing to that portion of cycle where air is drawn through the cake for partial air drying. Immediately following the air drying, the air is forced into the sector for the cake removal.

While the invention has been described with reference to particular illustration, there is no intent to limit the spirit or scope of the invention to the precise details except as defined in the following claims.

I claim:

1. A scraper assembly for disc filters wherein a scraper blade is mounted on each side of each filter disc for the removal of cake from said disc, comprising a blade mounted at its inner and outer ends adjacent to each side of the disc and both having a scraping edge disposed in close adjacency to a side of said disc, each said blade being resiliently mounted at its inner end, the outer mounting for each said blades including a blade holding member having a lever arm extending downwardly and inwardly toward the disc, the lower portion of each extending lever arm pivotally mounted at a point on a support disposed below the scraping edges of the blades each blade having inner and outer mounting means so constructed that each blade moves down and away from the disc independently of the opposite blade, but both being held in proximity to the disc, and resilient spring means operatively associated with each blade for independently biasing each said blade toward said disc.

2. A scraper assembly for disc filters wherein a scraper blade is mounted on each side of each filter disc for the removal of cake from said disc, comprising a blade mounted at its inner and outer ends adjacent to each side of the disc and both having a scraping edge disposed in close adjacency to said disc, each said blade being resiliently mounted at its inner end, the outer mounting including a blade holding member having a lever arm extending downwardly and inwardly toward the disc, the lower portions of said extending lever arms being crossed and pivotally mounted on a support disposed below the scraping edges of the blades each blade having inner and outer mounting means so constructed that each blade moves down and away from the disc independently of the opposite blade, but both being held in relative position to the disc, and resilient spring means operatively associated with each said lever arm for independently biasing each said blade toward said disc.

3. A scraper assembly for disc filters wherein a scraper blade is mounted on each side of each filter disc for the removal of cake from said disc, comprising a blade mounted at its inner and outer ends adjacent to each side of the disc and both having a scraping edge disposed in close adjacency to said disc, each said blade being resiliently mounted at its inner end, the outer mounting including a blade holding member having a lever arm extending downwardly and inwardly toward the disc, the lower portions of said extending lever arms being crossed and pivotally mounted on a common support disposed below the scraping edges of the blades each blade having inner and outer mounting means so constructed that each blade moves down and away from the disc independently of the opposite blade, but both being held in relative position to the disc, said lever arms each having a plate portion at its upper end extending laterally therefrom and resilient spring means operatively associated with each said plate portions and the associated support and held therebetween by a retaining means for independently biasing each said blade toward said disc.

4. A scraper assembly for disc filters wherein a scraper blade is mounted on each side of each filter disc for the removal of cake from said disc, comprising a blade mounted at its inner and outer ends adjacent to each side of the disc and both having a scraping edge disposed in close adjacency to said disc, each said blade being resiliently mounted at its inner end, the outer mounting including a blade holding member for each blade and each having a lever arm extending downwardly and inwardly toward the disc, said extending lever arms being crossed and pivotally mounted on a common support disposed below the scraping edges of the blades with the pivot of each on the opposite side of the disc from its associated blade scraping edge each blade having inner and outer mounting means so constructed that each blade moves down and away from the disc independently of the opposite blade, but both being held in relative position to the disc, and resilient spring means operatively associated with each said lever arm for independently biasing each said blade toward said disc.

5. A scraper assembly for filter discs wherein a scraper blade is mounted on each side of such a disc for removal of cake from said disc, comprising a pair of blades arranged for mounting on opposite sides of said disc, each said blade being resiliently mounted at its inner end and disposed with its scraping edge positioned in close adjacency to the disc, an outer mounting pivotally mounted on a support surface adjacent the outer peripheral edge of said disc, said pivotal mounting for each blade including a lever arm extending downwardly and inwardly from the blade toward the disc and connected at its lower end to a pivot on the support surface below the scraping edge of its associated blade, each blade inner and outer mounting means so constructed that each blade moves down and away from the disc independently of the opposite blade a spring operatively associated with blade mounting so as to independently bias each blade toward said disc, and guide means mounted on said outer support surface for centering said support having projecting surfaces on each side of the disc blade surface and its carried blades on a disc therebetween.

6. A scraper assembly according to claim 5 wherein said extending lever arms so pivoted on opposite sides of the disc guide means.

7. A scraper assembly for disc filters wherein a scraper blade is mounted on each side of a disc for removal of cake from said disc, comprising pivotal supports mounted on both sides of a filter disc, each said support being resiliently mounted at its inner end for limited movement, a blade secured to each said support, an outer blade support disposed on a support surface of the filter adjacent the outer peripheral edge of said disc, guide means mounted on said outer blade support and on both sides of said disc so as to maintain said outer blade support centered on said disc, said outer blade support including a lever arm secured to the outer end of each said blade, said lever arm extending downwardly and inwardly from its associated blade toward the disc and being pivotally secured to said outer blade support at its lower end below the removal point of the cake from the disc by the blade, and a spring mounted between each said lever arm and said outer blade support so as to independently bias said blade under spring pressure directed toward said disc, said inner mounting and outer blade support so constructed that each blade moves down and away from the disc independently of the opposite blade.

8. A scraper assembly according to claim 7 wherein the lever arms are crossed at their lower ends and each is pivoted at a point below the removal point of the cake from the disc on the opposite side of the disc and spaced substantially therefrom.

9. A scraper assembly for filter discs wherein a scraper blade is mounted on each side of such a disc for removal of cake from said disc, comprising a pair of blades arranged for mounting on opposite sides of said disc, each said blade being resiliently mounted at its inner end and each having a scraping edge positioned in close adjacency to the disc, an outer blade support adjacent the outer peripheral edge of said disc, said outer blade support including reciprocal support member having a base portion and an upright portion disposed between the ends of the base portion, a lever arm attached to the outer end of each said blade, said lever arm having a lateral surface portion and a portion extending downwardly and inwardly from its associated blade toward said disc and being pivotally secured at its lower end to said base portion at a point below the scraping edge of its associated blade, said inner mounting and support member so constructed that each blade moves down and away from the disc independently of the opposite blade, a spring mounted between said lateral portion of each said lever arm and said base portion so as to independently bias each blade toward said disc, and guide means mounted on said upright portion for centering said blade support on the disc therebetween.

10. A scraper assembly for disc filters wherein a scraper blade is mounted on each side of a disc for removal of cake from said disc, comprising pivotal supports mounted on both sides of a filter disc, each said support being resiliently mounted at its inner end for limited movement, a blade secured to each said support, an outer blade support including a reciprocal support member having a base portion disposed on a support surface of the filter adjacent the outer peripheral edge of said disc and an upright portion disposed between the ends of the base portion, guide means mounted on said upright portion and on both sides of said disc so as to maintain said support centered on said disc, said blade support including a lever arm secured to the outer end of each said blade, said lever arm having a lateral surface portion and a portion extending downwardly and inwardly from its associated blade toward the disc and being pivotally secured to said base portion at its lower end below the removal point of the cake from the disc by the blade and a spring mounted between each said lateral portion of each of said lever arm and said base portion so as to independently bias said blade under spring pressure directed toward said disc, the lever arms being crossed at their lower ends and each lever arm being pivoted at a point below the removal point of the cake from the disc on the opposite side of the disc and spaced substantially therefrom.

References Cited
UNITED STATES PATENTS

| | | | |
|---|---|---|---|
| 2,885,083 | 5/1959 | Peterson et al. | 210—327 X |
| 3,096,278 | 7/1963 | Francom | 210—327 |
| 2,974,802 | 3/1961 | Morehouse et al. | 210—396 |

SAMIH N. ZAHARNA, *Primary Examiner.*

REUBEN FRIEDMAN, *Examiner.*

F. SPEAR, *Assistant Examiner.*